US012061440B2

(12) United States Patent
Akazaki et al.

(10) Patent No.: US 12,061,440 B2
(45) Date of Patent: Aug. 13, 2024

(54) METHOD FOR MANUFACTURING TONER FOR ELECTROSTATIC CHARGE IMAGE DEVELOPMENT

(71) Applicant: ZEON CORPORATION, Tokyo (JP)

(72) Inventors: Kojiro Akazaki, Tokyo (JP); Takeru Chiba, Tokyo (JP); Takashi Iga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 257 days.

(21) Appl. No.: 17/418,941

(22) PCT Filed: Dec. 26, 2019

(86) PCT No.: PCT/JP2019/051306
§ 371 (c)(1),
(2) Date: Jun. 28, 2021

(87) PCT Pub. No.: WO2020/138369
PCT Pub. Date: Jul. 2, 2020

(65) Prior Publication Data

US 2022/0066336 A1 Mar. 3, 2022

(30) Foreign Application Priority Data

Dec. 28, 2018 (JP) ................................ 2018-248280
Dec. 28, 2018 (JP) ................................ 2018-248296

(51) Int. Cl.
*G03G 9/087* (2006.01)
*G03G 9/08* (2006.01)

(52) U.S. Cl.
CPC ......... *G03G 9/081* (2013.01); *G03G 9/08755* (2013.01); *G03G 9/08795* (2013.01); *G03G 9/08797* (2013.01)

(58) Field of Classification Search
CPC ... G03G 9/0804; G03G 9/081; G03G 9/09708
See application file for complete search history.

(56) References Cited

U.S. PATENT DOCUMENTS

2006/0275686 A1* 12/2006 Kadota ................ G03G 9/1135 430/123.51
2013/0171557 A1 7/2013 Watanabe et al.
2016/0004176 A1* 1/2016 Masuda ............... G03G 9/0821 430/111.4
2016/0124331 A1 5/2016 Malachowski et al.
2017/0160656 A1 6/2017 Suzumura et al.

FOREIGN PATENT DOCUMENTS

| | | | | |
|---|---|---|---|---|
| EP | 3088958 | * | 11/2016 | ............. G03G 9/087 |
| JP | 2001-100458 | A | 4/2001 | |
| JP | 2004-333798 | * | 11/2004 | ............. G03G 9/107 |
| JP | 2004-333798 | A | 11/2004 | |
| JP | 2012-93704 | A | 5/2012 | |
| JP | 2016-91025 | A | 5/2016 | |
| JP | 2017-107180 | * | 6/2017 | ............. G03G 9/087 |
| JP | 2017-107180 | A | 6/2017 | |
| WO | WO 2014-133032 | * | 4/2014 | ............... G03G 9/08 |
| WO | 2014/133032 | A1 | 9/2014 | |

OTHER PUBLICATIONS

Translation of JP 2017-107180.*
Translation of JP 2004-333798.*
International Preliminary Report on Patentability (Form PCT/IB/373) issued in counterpart International Application No. PCT/JP2019/051306 dated Jun. 16, 2021, with Form PCT/ISA/237. (9 pages).
International Search Report dated Feb. 25, 2020, issued in counterpart International Application No. PCT/JP2019/051306 (2 pages).

* cited by examiner

*Primary Examiner* — Peter L Vajda
(74) *Attorney, Agent, or Firm* — WHDA, LLP

(57) ABSTRACT

The present invention provides a method for producing a toner for electrostatic-image development comprising: a dispersing step of performing a dispersing treatment in which a cavitation effect is obtained on a color resin particle containing a binder resin, a colorant, a charge control agent, and a release agent in an aqueous dispersion medium so as to obtain a dispersion of the color resin particle; and a heating step of performing a heat treatment on the dispersion of the color resin particle at a temperature of equal to or more than a glass transition temperature of the color resin particle and 95° C. or less for a heating time of 5 minutes or more and 10 hours or less.

10 Claims, No Drawings

METHOD FOR MANUFACTURING TONER FOR ELECTROSTATIC CHARGE IMAGE DEVELOPMENT

TECHNICAL FIELD

The present invention relates to a method for producing a toner for electrostatic-image development used for developing an electrostatic latent image in electrophotography, electrostatic recording, electrostatic printing, and the like.

BACKGROUND

In an image forming apparatus such as an electrophotographic apparatus, an electrostatic recording apparatus, and an electrostatic printing apparatus, a developing agent is used to visualize an electrostatic latent image formed on a photosensitive member. The developing agent is mainly composed of a color particle (toner) in which a colorant, a charge control agent, a release agent, and the like are dispersed in a binder resin. Toner is called a toner for electrostatic-image development from the viewpoint of its function.

The method for producing the toner can be roughly divided into a pulverization method and a polymerization method. In the pulverization method, a toner (pulverized toner) composed of a color resin particle is produced by a method in which a binder resin, a colorant, and other additive components are melt-kneaded, and the melt-kneaded product is pulverized and classified. In the polymerization method, a polymerizable composition containing a polymerizable monomer, a colorant, and other additive components is polymerized by a suspension polymerization method, an emulsion polymerization aggregation method, a dispersion polymerization method, a dissolution suspension method, or the like, thereby producing a toner (polymerization) composed of a color resin particle.

According to the pulverization method, although there is an advantage that the toner can be produced at a relatively low cost, there has been a problem that the sphericity of the obtained toner is low and the fine line reproducibility is not sufficient as compared with the toner obtained by the polymerization method.

In contrast, for example, in Patent Document 1, it is disclosed a continuous method for rounding conventional toner particle comprising: mixing the dispersant and/or liquid (solution) with the dry toner particles, to form a conventional toner particle slurry; in the first heat exchanger, heating the conventional toner particle slurry to a first temperature exceeding the glass transition temperature to form a fused toner particle slurry; after the residence time, rapidly quenching the fused toner particle slurry to a second temperature lower than the glass transition temperature; recovering the rapidly quenched particle slurry at the outlet, thereby obtaining the roundness of the conventional toner particle in the rapidly quenched toner particle slurry is approximately 0.940 to 0.999, and controlling the time required for the heating, quenching, and the recovery is less than 20 minutes.

However, in the technique of Patent Document 1, it takes an extremely long time of 2 days to improve the sphericity of the toner, and therefore, it is not necessarily sufficient from the viewpoint of productivity.

RELATED ART DOCUMENTS

Patent Documents

Patent Document 1: JP-A-2016-91025

Summary OF THE INVENTION

Problem to be Solved by the Invention

The present invention has been made in view of such circumstances, and it is an object of the present invention to provide a method for producing a toner for electrostatic-image development capable of producing a toner for electrostatic-image development in which aggregate of color resin particles is effectively suppressed and which is excellent in balance with fine line reproducibility and blade cleaning property, with high productivity.

Means for Solving Problems

The present inventors have studied to achieve the above object and have found that the above object can be achieved by performing a dispersing treatment in which a cavitation effect is obtained on a color resin particle containing a binder resin, a colorant, a charge control agent, and a release agent in an aqueous dispersion medium, thereby obtaining a dispersion of the color resin particle and heating the obtained dispersion of the color resin particle under a predetermined condition, thereby completing the present invention.

That is, the present invention provides a method for producing a toner for electrostatic-image development comprising:

a dispersing step of performing a dispersing treatment in which a cavitation effect is obtained on a color resin particle containing a binder resin, a colorant, a charge control agent, and a release agent in an aqueous dispersion medium so as to obtain a dispersion of the color resin particle; and a heating step of performing a heat treatment on the dispersion of the color resin particle at a temperature of equal to or more than a glass transition temperature of the color resin particle and 95° C. or less for a heating time of 5 minutes or more and 10 hours or less.

In the method for producing a toner for electrostatic-image development of the present invention, it is preferable that the method further comprises a colloidal dispersion preparation step of reacting an alkali metal hydroxide salt and/or an alkaline earth metal hydroxide salt with a water-soluble polyvalent metal salt (excluding the alkaline earth metal hydroxide salt) in an aqueous medium so as to prepare a colloidal dispersion containing a metal hydroxide colloidal particle which is poorly water-soluble, and the dispersing step is a step of performing the dispersing treatment in which a cavitation effect is obtained on the color resin particle in the colloidal dispersion containing the metal hydroxide colloidal particle.

In the method for producing a toner for electrostatic-image development of the present invention, it is preferable that an amount of the colloidal dispersion is set to 100 parts by mass or more with respect to 100 parts by mass of the color resin particle in the dispersing step.

In the method for producing a toner for electrostatic-image development of the present invention, it is preferable that in the colloidal dispersion preparation step, an amount of the alkali metal hydroxide salt and/or the alkaline earth metal hydroxide salt is set to an amount in which a chemical equivalent ratio b/a of a chemical equivalent "b" of the alkali metal hydroxide salt and/or the alkaline earth metal hydroxide salt with respect to a chemical equivalent "a" of the water-soluble polyvalent metal salt satisfies a relationship of $0.3 \le b/a \le 1.0$.

In the method for producing a toner for electrostatic-image development of the present invention, it is preferable that the water-soluble polyvalent metal salt is at least one selected from a magnesium metal salt, a calcium metal salt, and an aluminum metal salt.

In the method for producing a toner for electrostatic-image development of the present invention, it is preferable that the color resin particle is obtained by pulverizing a kneaded product, the kneaded product being obtained by mixing the binder resin, the colorant, the charge control agent, and the release agent and then kneading a mixture thereof under heating.

In the method for producing a toner for electrostatic-image development of the present invention, it is preferable that the dispersing step is a step of dispersing a color resin particle containing the binder resin, the colorant, the charge control agent, the release agent, and a polar resin with an acid value of 0.5 to 7.0 mgKOH/g and having a number volume average particle diameter of 5.0 to 12.0 μm in an aqueous dispersion medium, and the binder resin has a glass transition temperature of 40 to 70° C., and the polar resin has a glass transition temperature of 10 to 30° C. higher than the glass transition temperature of the binder resin.

In the method for producing a toner for electrostatic-image development of the present invention, it is preferable that the polar resin is a copolymer of an acrylic acid ester and/or a methacrylic acid ester with acrylic acid and/or methacrylic acid, and has a weight average molecular weight of 6,000 to 50,000 and a glass transition temperature of 60 to 85° C.

In the method for producing a toner for electrostatic-image development of the present invention, it is preferable that the release agent has a melting point of 60 to 100° C.

In the method for producing a toner for electrostatic-image development of the present invention, it is preferable that the color resin particle is obtained by pulverizing a kneaded product, the kneaded product being obtained by mixing the binder resin, the colorant, the charge control agent, the release agent, and the polar resin with an acid value of 0.5 to 7.0 mgKOH/g and then kneading a mixture thereof under heating.

Effects of Invention

According to the present invention, it is possible to produce a toner for electrostatic-image development in which aggregate of color resin particles is effectively suppressed and which is excellent in balance with fine line reproducibility and blare cleaning property, with high productivity.

DESCRIPTION OF EMBODIMENTS

A method for producing a toner for electrostatic-image development (hereinafter, sometimes simply referred to as "toner") of the present invention comprises:

a dispersing step of performing a dispersing treatment using a cavitation effect on a color resin particle containing a binder resin, a colorant, a charge control agent, and a release agent in an aqueous dispersion medium so as to obtain a dispersion of the color resin particle; and a heating step of performing a heat treatment on the dispersion of the color resin particle at a temperature of equal to or more than a glass transition temperature of the color resin particle and 95° C. or less for a heating time of 5 minutes or more and 10 hours or less.

Color Resin Particle Before Heat Treatment

First, a color resin particle used in the method for production of the present invention (hereinafter, the color resin particle before performing the dispersing treatment and the heat treatment according to the method for production of the present invention will be referred to as "color resin particle before heat treatment" as appropriate) will be described.

The color resin particle before heat treatment used in the method for production of the present invention are obtained by a pulverization method which is an example of a dry method described below.

In other words, in the pulverization method, first, a binder resin, a colorant, a charge control agent, and a release agent, and other additives to be added if necessary, are mixed using a mixer such as a ball mill, a V-type mixer, a Henschel mixer (trade name), a high-speed dissolver, an internal mixer, and a fallburg. Next, the mixture obtained as described above is kneaded while being heated by using a pressure kneader, a twin-screw extrusion kneader, a roller, or the like. The obtained kneaded product is coarsely pulverized using a pulverizer such as a hammer mill, a cutter mill, or a roller mill. Further, after finely pulverizing by using a pulverizer such as a jet mill and a high-speed rotary pulverizer, the particles are classified into a desired particle size by a classifier such as a wind classifier and an airflow classifier, whereby a color resin particle before heat treatment can be obtained.

Examples of the binder resin include, but are not limited to, polystyrene resin, polyester resin, styrene-alkyl acrylate copolymer, styrene-alkyl methacrylate copolymer, styrene-acrylonitrile copolymer, styrene-butadiene copolymer, styrene-maleic anhydride copolymer, polyethylene resin, and polypropylene resin. Of these, from the viewpoint of low-temperature fixing property and heat-resistant storage property, a styrene-alkyl acrylate copolymer and a polyester resin are preferred, and a polyester resin is more preferred, and a polyester resin obtained by condensation polymerization of a diol component and a divalent acid component is suitable.

The diol component for constituting the polyester resin is not particularly limited, but etherified diphenols can be suitably used, and specific examples of the etherified diphenols include etherified bisphenols obtained by adding 2 to 10 mol of ethylene oxide or propylene oxide to bisphenol A.

Examples of the divalent acid component for constituting the polyester resin include aliphatic dicarboxylic acids and aromatic dicarboxylic acids.

Examples of the aliphatic dicarboxylic acids include branched long-chain dibasic acids having 12 to 28 carbons which is synthesized using 1-hydroperoxycyclohexanol as an intermediate, such as 2-butyloctanedioic acid, 8-vinyl-10-octadecenedioic acid, 8-ethyloctadecanedioic acid, 8,13-dimethyl-8,12-icosadienedioic acid, 8,13-dimethylicosanedioic acid, and 8,9-diphenylhexadecanedioic acid; acid anhydrides thereof, and lower alkyl esters thereof.

Examples of the aromatic dicarboxylic acids include terephthalic acid, isophthalic acid, phthalic acid, naphthalene-2,7-dicarboxylic acid, and naphthalene-2,6-dicarboxylic acid.

Each of the above divalent acid components may be used alone or in combination of two or more thereof. In addition, from the viewpoint of enhancing the low-temperature fixing property and the heat-resistant storage property, the amount of the aliphatic dicarboxylic acid to be used in the total acid component is preferably set at a ratio of 3 to 45 mol %. When an aromatic polycarboxylic acid having trivalent or more valences is used as a cross-linking component to be described later, it is preferable to set the amount in the total acid component obtained by summing the above divalent acid component and the aromatic polycarboxylic acid having trivalent or more valences as the amount described above.

Further, as the polyester resin, it may be one obtained by further polycondensation of a cross-linking component in addition to the above-mentioned diol component and the divalent acid component. Such a cross-linking component is not particularly limited, and examples thereof include an aromatic polycarboxylic acid having trivalent or more valences.

Examples of the aromatic polycarboxylic acid having trivalent or more valences include trimellitic acid, polycarboxylic acid, 2,5,7-naphthalenetricarboxylic acid, 1,2,4-naphthalenetricarboxylic acid, and anhydrides thereof. Each of the aromatic polycarboxylic acids having trivalent or more valences may be used alone or in combination of two or more thereof.

When the aromatic polycarboxylic acid having trivalent or more valences is used as a cross-linking component, the amount of the aromatic polycarboxylic acid having trivalent or more valences is preferably set to a ratio of 3 to 30 mol % in the total acid component from the viewpoint of enhancing the offset resistance and the low-temperature fixing property.

The polyester resin can be produced, for example, by condensation polymerization of the above-mentioned diol component, divalent acid component, and optionally used cross-linking component in an inert gas atmosphere at a temperature of 150 to 300° C. In order to accelerate the reaction, for example, dibutyltin oxide, zinc oxide, dibutyltin dilaurate, and the like can be used as a catalyst. In addition, in the condensation polymerization, from the viewpoint of accelerating the reaction, it is also possible to carry out the reaction under reduced pressure or to carry out the reaction under reflux of a solvent.

The glass transition temperature of the binder resin is preferably 40 to 70° C., more preferably 45 to 65° C., and still more preferably 50 to 60° C. By setting the glass transition temperature within the above range, it is possible to more appropriately enhance the low-temperature fixing property and the heat-resistant storage property. The glass transition temperature of the binder resin can be determined, for example, according to ASTM D3418-82. In addition, when a polyester resin is used as the binder resin, the acid value of the polyester resin is preferably 0.0 to 20 mgKOH/g, more preferably 1 to 20 mgKOH/g, still more preferably 2 to 10 mgKOH/g, and particularly preferably 3 to 7 mgKOH/g. By setting the acid value of the polyester resin within the above range, the hygroscopicity of the toner can be appropriately suppressed, and thus, it can be appropriately used even at high temperatures. The acid value of the polyester resin is a value measured according to JIS K 0070, which is a criterion oil and fat analysis method established by the Japan Industrial Standards Committee (JICS).

In addition, when a polar resin having an acid value of 0.5 to 7.0 mgKOH/g to be described later is further used, as the binder resin, it is preferable to use a resin having an acid value of 0.0 to 0.4 mgKOH/g, more preferably a resin having an acid value of 0.0 to 0.3 mgKOH/g, and still more preferably a resin having an acid value of 0.0 to 0.2 mgKOH/g.

As the colorant, when color toner (usually, four toners of black, cyan, yellow, and magenta toners are used) is produced, a black colorant, a cyan colorant, a yellow colorant, and a magenta colorant are used for the respective color toners.

Examples of the black colorant include pigments and dyes such as carbon black, titanium black, magnetic powders of zinc iron oxide and nickel iron oxide, and the like.

Examples of the cyan colorant to be used include compounds such as copper phthalocyanine pigments and derivatives thereof, and anthraquinone pigments and dyes. Specifically, examples thereof include C.I. Pigment Blues 2, 3, 6, 15, 15:1, 15:2, 15:3, 15:4, 16, 17:1, 60, and the like.

Examples of the yellow colorant to be used include compounds such as azo pigments such as monoazo pigments and disazo pigments, and fused polycyclic pigments and dyes. Specifically, examples thereof include C.I. Pigment Yellows 3, 12, 13, 14, 15, 17, 62, 65, 73, 74, 83, 93, 97, 120, 138, 151, 155, 180, 181, 185, 186, 214, and 219; and C.I. Solvent Yellows 98, and 162; and the like.

Examples of the magenta colorant to be used include compounds such as azo pigments such as monoazo pigments and disazo pigments; fused polycyclic pigments and dyes; and the like. Specifically, examples thereof include C.I. Pigment Reds 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, and 251; C.I. Solvent Violets 31, 47, and 59; C.I. Pigment Violet 19; and the like.

Each colorant may be used alone or in combination of two or more, and the amount of the colorant to be used is preferably 1 to 10 parts by mass, more preferably 2 to 8 parts by mass with respect to 100 parts by mass of the binder resin.

As the charge control agent, there is no particular limitation as long as it is generally used as a charge control agent for a toner, but among the charge control agents, from the viewpoint that a compatibility with a binder resin is high, a stable charging property (charging stability) can be imparted to the toner particle, and thereby, the dispersibility of the colorant can be improved, a charge control resin having a positive charging property or a negative charging property is preferred. And further, from the viewpoint that a negative charging property toner is obtained, a charge control resin having a negative charging property is more preferably used.

Examples of the positively chargeable charge control agent include a nigrosine dye, a quaternary ammonium salt, a triaminotriphenylmethane compound and an imidazole compound, and, as charge control resins which are preferably used, a polyamine resin, quaternary ammonium group-containing copolymer and quaternary ammonium salt group-containing copolymer.

Examples of the negatively chargeable charge control agent include an azo dye containing a metal such as Cr, Co, Al, and Fe, a salicylic acid metal compound and an alkylsalicylic acid metal compound, and a sulfonic acid group-containing copolymer, a sulfonate group-containing copolymer, a carboxylic acid group-containing copolymer, and a carboxylate group-containing copolymer as charge control resins which are preferably used.

The weight average molecular weight (MW) of the charge control resin is within a range of 5,000 to 30,000, preferably within a range of 8,000 to 25,000, and more preferably within a range of 10,000 to 20,000, in terms of polystyrene measured by gel permeation chromatography (GPC) using tetrahydrofuran.

In addition, the copolymerization ratio (amount of functional groups) of the monomer having a functional group such as a quaternary ammonium group and a sulfonate group in the charge control resin is preferably within a range of 0.5 to 12% by mass, more preferably within a range of 1.0 to 6% by mass, and still more preferably within a range of 1.5 to 3% by mass.

The content of the charge control agent is preferably 0.01 to 20 parts by mass, more preferably 0.03 to 10 parts by mass, still more preferably 0.03 to 8 parts by mass with respect to 100 parts by mass of the birder resin. By setting the amount of the charge control agent to be added within the above range, it while effectively suppressing the occurrence of fogging and the occurrence of print dirt.

As the release agent, a release agent generally used as a release agent for a toner can be used without any particular limitation, but from the viewpoint of appropriately enhancing the low-temperature fixing property of the obtained toner, a release agent having a number average molecular weight (Mn) of 500 to 1500 is preferable, and a fatty acid ester compound having a number average molecular weight (Mn) of 500 to 1500 is preferable. Note that the "fatty acid ester compound" refers to a product obtained by an ester reaction of a monovalent alcohol and/or a polyvalent alcohol and a saturated fatty acid and/or an unsaturated fatty acid.

Examples of monovalent alcohols include monovalent saturated aliphatic alcohols such as methanol, ethanol, 1-propanol, 2-propanol, 1-butanol, 2-butanol, 1-pentanol, 1-hexanol, octanol, 2-ethyl-1-hexanol, nonyl alcohol, lauryl alcohol, cetyl alcohol, stearyl alcohol, and behenyl alcohol; monovalent unsaturated aliphatic alcohols such as allyl alcohol, methallyl alcohol, crotyl alcohol, and oleyl alcohol; monovalent alicyclic alcohols such as cyclohexanol; monovalent aromatic alcohols such as phenol, phenyl methanol (benzyl alcohol) methyl phenol (cresol), p-ethyl phenol, dimethyl phenol (xylenol), nonyl phenol, dodecyl phenol, phenyl phenol, and naphthol.

Specific examples of the polyvalent alcohol include divalent saturated aliphatic alcohols such as ethylene glycol, and propylene glycol; divalent aromatic alcohols such as catechol, and hydroquinone; three- or more-valent saturated aliphatic alcohols such as glycerin, pentaerythritol, dipentaerythritol, and polyglycerin; and the like.

Among these monovalent alcohols and polyvalent alcohols, monovalent to tetravalent saturated aliphatic alcohols are preferred, behenyl alcohol and pentaerythritol are more preferred, and behenyl alcohol is particularly preferred.

The fatty acid serving as a raw material of the fatty acid ester compound is preferably a saturated fatty acid and/or an unsaturated fatty acid having 12 to 22 carbon atoms, more preferably these having 14 to 18 carbon atoms. Of these, a saturated fatty acid having the above number of carbon atoms is particularly preferred because a fatty acid ester compound having a number average molecular weight (Mn) of 500 to 1500 is easily obtained.

Specific examples of the saturated fatty acid having the above carbon number include, but are not limited to, lauric acid (carbon number of 12), myristic acid (carbon number of 14), pentadecyl acid (carbon number of 15), palmitic acid (carbon number of 16), margaric acid (carbon number of 17), stearic acid (carbon number of 18), arachidic acid (carbon number of 20), and behenic acid (carbon number of 22). Among these saturated fatty acids, stearic acid (carbon number of 18), arachidic acid (carbon number of 20), and behenic acid (carbon number of 22) are preferred, and stearic acid (carbon number of 18) is more preferred.

Specific examples of the unsaturated fatty acid are not particularly limited, and examples thereof include the following compounds.

palmitoleic acid ($CH_3(CH_2)_5CH{=}CH(CH_2)_7COOH$)
oleic acid ($CH_3(CH_2)_7CH{=}CH(CH_2)_7COOH$)
vaccenic acid ($CH_3(CH_2)_5CH{=}CH(CH_2)_5COOH$)
linoleic acid ($CH_3(CH_2)_3(CH_2CH{=}CH)_2(CH_2)_7COOH$)
(9,12,15)-linolenic ($CH_3(CH_2CH{=}CH)_3(CH_2)_7COOH$)
(6,9,12)-linolenic ($CH_3(CH_2)_3(CH_2CH{=}CH)_3(CH_2)_4COOH$)
eleostearic acid ($CH_3(CH_2)_3(CH{=}CH)_3(CH_2)_7COOH$)
arachidonic acid ($CH_3(CH_2)_3(CH_2CH{=}CH)_4(CH)_3COOH$)

Note that, only one kind of the above-mentioned saturated fatty acids and/or unsaturated fatty acids may be used alone, or two or more kinds thereof may be used in combination.

The fatty acid ester compound as described above can be produced according to a conventional method. Examples of the method for producing such a fatty acid ester compound include a method of performing an ester reaction using a monovalent alcohol and/or a polyvalent alcohol and a saturated fatty acid and/or an unsaturated fatty acid. Further, it is also possible to use a commercially available fatty acid ester compound as the fatty acid ester compound, and examples of the commercially available fatty acid ester compound include "WEP2", "WEP3", "WEP4", "WEP5", "WE6", and "WE11" (trade name) manufactured by NOF Corporation, and the like.

In addition, a release agent other than the fatty acid ester compound may be used as the release agent in place of or together with the fatty acid ester compound described above, and examples thereof include a low molecular weight polyolefin wax, and a modified wax thereof; a plant-based natural wax such as jojoba; a petroleum wax such as paraffin; a mineral-based wax such as ozokerite; a synthetic wax such as Fischer-Tropsch wax; an ester of a polyvalent alcohol ester such as dipentaerythritol ester; and the like. These may be used only in one kind, and two or more kinds thereof may be used in combination.

The number average molecular weight (Mn) of the release agent is preferably 500 to 1500, more preferably 550 to 1200, and still more preferably 550 to 1100. Note that, the number average molecular weight (Mn) of the release agent can be measured, for example, in terms of polystyrene measured by gel permeation chromatography (GPC) using tetrahydrofuran.

The melting point of the release agent is preferably 50 to 90° C., more preferably 60 to 90° C., still more preferably 65 to 80° C., and particularly preferably 68 to 80° C., most preferably 70 to 80° C. from the viewpoint of further enhancing the low-temperature fixing property of the obtained toner.

The content of the release agent is preferably 1 to 30 parts by mass, more preferably 3 to 22 parts by mass, and still more preferably 6 to 15 parts by mass, with respect to 100 parts by mass of the binder resin. By setting the content of the release agent in the above range, the low-temperature fixing property can be further enhanced while making the particle size distribution of the obtained toner relatively uniform.

Further, it is preferable that the color resin particle before heat treatment further contains a polar resin having an acid value of 0.5 to 7.0 mgKOH/g. In other words, it is preferable that the color resin particle before heat treatment further contains the polar resin having an acid value of 0.5 to 7.0 mgKOH/g in addition to the binder resin, the colorant, the charge control agent, and the release agent, and it is preferable that the color resin particle before heat treatment is one obtained by mixing these with other additives to be added if necessary using a mixer. Further, as such a polar resin, it is preferable to use a resin whose glass transition temperature (hereinafter, the glass transition temperature of the polar resin is referred to as "$Tg_p$" as appropriate) is 10 to 30° C. higher than the glass transition temperature of the above-mentioned binder resin (hereinafter, the glass transition temperature of the binder resin is referred to as "$Tg_b$" as appropriate) (i.e., the glass transition temperature $Tg_p$ is in the range of ($Tg_b$+10) to ($Tg_b$+30°) C), so that it is possible that the obtained toner for electrostatic-image development is excellent in low-temperature fixing property and heat-resistant storage property, and the generation of toner jetting after leaving at high temperature can be appropriately suppressed.

As the polar resin, one having an acid value of 0.5 to 7.0 mgKOH/g may be used, but the acid value is preferably 1 to 6 mgKOH/g, more preferably 1.5 to 4 mgKOH/g. The glass transition temperature $Tg_p$ of the polar resin is preferably 13 to 27° C. higher than the glass transition temperature $Tg_b$ of the binder resin described above (i.e., in the range of ($Tg_b$+13) to ($Tg_b$+27°) C), and more preferably 15 to 25° C. higher than the glass transition temperature $Tg_b$ of the binder resin described above (i.e., in the range of ($Tq_b$+15) to ($Tg_b$+25°) C). The glass transition temperature $Tg_p$ of the polar resin may fall within the above ranges in relation to the glass transition temperature $Tg_b$ of the binder resin described above, but the glass transition temperature $Tg_b$ per se is preferably 60 to 85° C. (i.e., $Tg_p$=60 to 85° C.), more preferably 65 to 80° C. (i.e., $Tg_p$=65 to 80° C.), and still more preferably 70 to 77° C. (i.e., $Tg_p$=70 to 77° C.).

When the acid value of the polar resin is in the above range, the effect of improving the heat-resistant storage property and the effect of suppressing the occurrence of toner jetting after leaving at a high temperature can be more appropriately exhibited while appropriately preventing the toner from becoming difficult to use under high humidity due to that the hygroscopicity of the toner becomes high. In addition, by setting the glass transition temperature $Tg_p$ of the polar resin within the above range, it is possible to more appropriately exhibit the effect of improving the heat-resistant storage property and the effect of suppressing the generation of the toner jetting after leaving at a high temperature while making the low-temperature fixing property good. The acid value of the polar resin is a value measured according to JIS K 0070, which is a criterion oil and fat analysis method established by the Japan Industrial Standards Committee (JICS). The glass transition temperature $Tg_p$ of the polar resin can be determined, for example, in accordance with ASTM D3418-82.

As such a polar resin, as long as the acid value and the glass transition temperature $Tq_p$ are in the above ranges, and there are no particular limitations thereon, but an acrylic resin may be suitably used. The acrylic resin is a copolymer (acrylate copolymer) containing at least one of an acrylic acid ester and a methacrylic acid ester and at least one of acrylic acid and methacrylic acid as a main component. As the acid monomer, acrylic acid is preferred.

Examples of the acrylic resin include a copolymer of the acrylic ester and the acrylic acid, a copolymer of the acrylic ester and the methacrylic acid, a copolymer of the methacrylic ester and the acrylic acid, a copolymer of the methacrylic ester and the methacrylic acid, a copolymer of the acrylic ester and the methacrylic ester, a copolymer of the acrylic ester, the methacrylic ester and the methacrylic acid, and a copolymer of the acrylic ester, the methacrylic ester, the acrylic acid and the methacrylic acid. Of these, the copolymer of the acrylic ester, the methacrylic ester and the acrylic acid is preferably used.

The weight average molecular weight (Mw) of the acrylic resin is usually 6,000 to 50,000, preferably 83,000 to 25,000, and more preferably 10,000 to 20,000.

When the weight average molecular weight (Mw) of the acrylic resin is within the above range, heat-resistant storage and low-temperature fixing property can be improved.

In the acrylic resin, the ratio of an acrylic ester monomer unit, a methacrylic ester monomer unit, an acrylic acid monomer unit, and a methacrylic acid monomer unit is not particularly limited as long as it satisfies the above-escribed acid value, weight average molecular weight MW, and glass transition temperature.

The ratio of the four types of monomer units described above can be adjusted by the mass ratio of the amount of the acrylic ester, the methacrylic ester, the acrylic acid, and the methacrylic acid added during the synthesis of the copolymer. The mass ratio of the amount to be added is, for example, (acrylic ester and/or methacrylic ester):(acrylic acid and/or methacrylic acid)=(99 to 99.95):(0.05 to 1). It is preferable that (acrylic ester and/or methacrylic ester):(acrylic acid and/or methacrylic acid)=(99.4 to 99.9):(0.1 to 0.6), and more preferably (acrylic ester and/or methacrylic ester):(acrylic acid and/or methacrylic acid)=(99.5 to 99.7):(0.3 to 0.5).

Examples of the acrylic ester used for forming the acrylic resin include methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, isopentyl acrylate, neopentyl acrylate, n-hexyl acrylate, isohexyl acrylate, neohexyl acrylate, sec-hexyl acrylate, and tert-hexyl acrylate. Among these, ethyl acrylate, n-propyl acrylate, isopropyl acrylate, and n-butyl acrylate are preferred, and n-butyl acrylate is more preferred.

Examples of the acrylic ester used for forming the acrylic resin include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, isopentyl methacrylate, neopentyl methacrylate, n-hexyl methacrylate, isohexyl methacrylate, neohexyl methacrylate, sec-hexyl methacrylate, and tert-hexyl methacrylate. Among these, methyl methacrylate, n-propyl methacrylate, isipropyl methacrylate, and n-butyl methacrylate are preferred, and methyl methacrylate is more preferred.

The acrylic resin may be commercially available, but may be produced by a known method such as a solution polymerization method, an aqueous solution polymerization method, an ionic polymerization method, a high-temperature and high-pressure polymerization method, and a suspension polymerization method.

The amount of the polar resin to be added is preferably 0.3 to 4 parts by mass, more preferably 0.5 to 3.0 parts by mass, still more preferably 0.6 to 2.5 parts by mass, and particularly preferably 0.7 to 2.0 parts by mass, with respect to 100 parts by mass of the binder resin. By setting the amount of the acrylic resin to be added in the above range, it is possible to make the effect for adding sufficient while making the environmental stability good.

The number volume average particle diameter of the color resin particle before heat treatment used in the present invention is preferably 5.0 to 10.0 μm, more preferably 5.5 to 9.0 μm, and particularly preferably 6.0 to 8.0 μm. The number volume average particle diameter of the color resin particle before heat treatment can be adjusted by controlling the pulverization condition and the classification condition when it is produced by the above-described pulverization method.

The glass transition temperature $Tg_r$ of the color resin particle before heat treatment used in the present invention is preferably 40 to 70° C., more preferably 45 to 65° C., and still more preferably 50 to 60° C. When the glass transition temperature of the color resin particle before heat treatment is within the above range, it is possible to more appropriately enhance the low-temperature fixing property and the heat-resistant storage property.

Dispersing Step

Then, in the method for production of the present invention, first, using the above-escribed color resin particle before heat treatment, a dispersing treatment in which a cavitation effect is obtained is performed on the obtained color resin particle before heat treatment described above in an aqueous dispersion medium, thereby obtaining a dispersion of the color resin particle before heat treatment (dispersing step).

The aqueous dispersion medium used in the dispersing step is a medium obtained by dissolving or dispersing a dispersion stabilizing agent in an aqueous medium. As the aqueous medium, water my be used alone, but a solvent which can be dissolved in water may be used in combination. Examples of the solvent which can be dissolved in water include lower alcohols such as methanol, ethanol, and isopropanol, and lower ketones such as dimethylformamide, tetrahydrofuran, acetone, and methyl ethyl ketone.

The dispersion stabilizing agent may be any compound capable of imparting dispersibility for dispersing the color resin particle before heat treatment in the aqueous medium, and the organic dispersion stabilizing agent may be, for example, a water-soluble polymer such as polyvinyl alcohol, methylcellulose, and gelatin; a surfactant such as an anionic surfactant, a nonionic surfactant, and an amphoteric surfactant; or the like. As an inorganic dispersion stabilizing agent, examples thereof include metal oxides such as aluminum oxide and titanium oxide; sulfates such as barium sulfate and calcium sulfate; carbonates such as barium carbonate, calcium carbonate, and magnesium carbonate; phosphates such as calcium phosphate, magnesium phosphate, and aluminum phosphate; metal hydroxides such as aluminum hydroxide, magnesium hydroxide, and ferric hydroxide; and among these, an inorganic dispersion stabilizing agent is preferred, and a phosphate or metal hydroxide is more preferred, and a metal hydroxide is further preferred.

In addition, among the inorganic dispersion stabilizing agents, a poorly water-soluble inorganic dispersion stabilizing agent is preferred, and in particular, a poorly water-soluble inorganic dispersion stabilizing agent is preferably used in the form of colloidal particle in a state in which the inorganic dispersion stabilizing agent is dispersed in an aqueous medium, that is, in the form of colloidal dispersion containing colloidal particle of poorly water-soluble inorganic dispersion stabilizing agent. By using the poorly water-soluble inorganic dispersion stabilizing agent in the state of a colloidal dispersion containing colloidal particle of poorly water-soluble inorganic dispersion stabilizing agent, in addition to being able to narrow the particle size distribution of the color resin particle before heat treatment, the residual amount thereof in the obtained toner can be easily suppressed low by washing, so that the fine line reproducibility can be further increased and further, it contributes to environmental stability.

The colloidal dispersion containing colloidal particle of poorly water-soluble inorganic dispersion stabilizing agent can be prepared, for example, by reacting an alkali metal hydroxide salt and/or an alkaline earth metal hydroxide salt with a water-soluble polyvalent metal salt (excluding the alkaline earth metal hydroxide salt) in an aqueous medium.

Examples of the alkali metal hydroxide salt include lithium hydroxide, sodium hydroxide, and potassium hydroxide. Examples of the alkaline earth metal hydroxide salt include barium hydroxide and calcium hydroxide.

As the water-soluble polyvalent metal salt, any polyvalent metal salt that exhibits water solubility other than the compound corresponding to the above alkaline earth metal hydroxide salt may be used, and examples thereof include magnesium metal salts such as magnesium chloride, magnesium phosphate, and magnesium sulfate; calcium metal salts such as calcium chloride, calcium nitrate, calcium acetate, and calcium sulfate; aluminum metal salts such as aluminum chloride, aluminum sulfate; barium salts such as barium chloride, barium nitrate, and barium acetate; zinc salts such as zinc chloride, zinc nitrate, and zinc acetate; and the like. Of these, magnesium metal salts, calcium metal salts, and aluminum metal salts are preferred, magnesium metal salts are more preferred, and magnesium chloride is particularly preferred. Each of the water-soluble polyvalent metal salts may be used alone or in combination of two or more thereof.

The method of reacting the above-mentioned alkali metal hydroxide salt and/or alkaline earth metal hydroxide salt with the above-mentioned water-soluble polyvalent metal salt in an aqueous medium is not particularly limited, and examples thereof include a method of mixing an aqueous solution of the alkali metal hydroxide salt and/or the alkaline earth metal hydroxide salt with the aqueous solution of the water-soluble polyvalent metal salt. In this case, from the viewpoint that the particle diameter of the colloidal particle of poorly water-soluble metal hydroxide can be suitably controlled, a method of mixing by gradually adding the aqueous solution of the alkali metal hydroxide salt and/or the alkali earth metal hydroxide salt into the aqueous solution of the water-soluble polyvalent metal salt while stirring the aqueous solution of the water-soluble polyvalent metal salt is preferred.

Although the ratio of the alkali metal hydroxide salt and/or the alkaline earth metal salt hydroxide salt to the water-soluble polyvalent metal salt is not particularly limited, the amount of the alkali metal salt hydroxide and/or the alkaline earth metal salt hydroxide salt to be used is preferably an amount in which the chemical equivalent ratio b/a of the chemical equivalent "b" of the alkali metal salt hydroxide and/or the alkaline earth metal salt hydroxide with respect to the chemical equivalent "a" of the water-soluble polyvalent metal salt satisfies a relationship of $0.3 \leq b/a \leq 1.0$, and more preferably an amount satisfying a relationship of $0.4 \leq b/a \leq 1.0$.

The amount of the dispersion stabilizing agent to be used is preferably 1 part by mass or more, more preferably 10 to 500 parts by mass, and still more preferably 20 to 300 parts by mass, with respect to 100 parts by mass of the color resin particle from the viewpoint of satisfactorily dispersing the color resin particle.

In the dispersing step, by preforming a dispersing treatment in which a cavitation effect is obtained on the above-described color resin particle before heat treatment in an aqueous dispersion medium, thereby a dispersion of the color resin particle before heat treatment is obtained.

In the present invention, the dispersing treatment in which a cavitation effect is obtained is a dispersion method using a shock wave generated by bursting a vacuum bubble generated in a liquid when high energy is applied to the liquid. By using such a dispersion method, it is possible to uniformly adsorb the dispersion stabilizing agent contained in the aqueous dispersion medium on the surface of the color resin particle before the heat treatment, and thereby it is possible to uniformly disperse the color resin particle before the heat treatment in the aqueous dispersion medium.

Specific examples of the dispersing treatment in which the cavitation effect is obtained include dispersing treatment by ultrasonic waves, dispersing treatment by a high shear stirring apparatus using an in-line emulsification disperser or the like, dispersing treatment by a jet mill, and the like. These dispersing treatments may be performed by only one treatment or by a combination of a plurality of dispersing treatments. More specifically, as the dispersing treatment in which the cavitation effect is obtained, a dispersing treatment using an ultrasonic homogenizer, a dispersing treatment using a high shear stirring apparatus, and a dispersing treatment using a jet mill are suitably used. These devices or apparatus may be conventionally known devices or apparatus.

The treatment time of the dispersing treatment in which the cavitation effect is obtained is preferably 1 to 300 minutes, more preferably 5 to 100 minutes.

Heating Step

Then, the dispersion of the color resin particle before heat treatment prepared in the above dispersing step is heated at a temperature of equal to or more than a glass transition temperature of the color resin particle contained in the color resin particle before heat treatment, and 95° C. or less for a heating time of 5 minutes or more and 10 hours or less (heating step).

According to the present invention, by heating the dispersion of the color resin particle before heat treatment prepared in the dispersing step under the above conditions, the sphericity of the color resin particle after the heat treatment can be improved, whereby a toner excellent in balance in fine line reproducibility and blade cleaning property can be obtained while effectively suppressing the occurrence of aggregate between the color resin particles after the heat treatment, and in particular, according to the present invention, such a toner can be obtained with high productivity.

The heating temperature in the heating step is equal to or more than the glass transition temperature of the color resin particle before heat treatment, and 95° C. or less, preferably 10° C. higher than the glass transition temperature of the color resin particle before heat treatment or more (i.e., when the glass transition temperature of the color resin particle before heat treatment is set to $Tg_r$, ($Tg_r$+10° C.) or more) and 94° C. or less, more preferably 20° C. higher than the glass transition temperature of the color resin particle before heat treatment or more (i.e., ($Tg_r$+20° C.) or more) and 93° C. or less. Note that, the specific heating temperature in the heating step is not particularly limited, but is preferably 60 to 94° C., more preferably 70 to 93° C., still more preferably 75 to 92° C., and particularly preferably 80 to 90° C. Further, the heating time in the heating step is 5 minutes or more and 10 hours or less, preferably 10 minutes or more and 10 hours or less, more preferably 30 minutes or more and 8 hours or less. According to the method for production of the present invention, even when the heating time in the heating step is set to a relatively short time as described above, the sphericity of the color resin particle after the heat treatment can be appropriately increased, and thus high productivity can be realized. If the heating temperature is too low, the effect of improving the sphericity cannot be obtained. If the heating temperature is too high, an affect of vaporization of the aqueous medium becomes large, and stable production becomes difficult.

Then, it is preferable to perform a series of operations of washing, filtration, dehydration, and drying, if necessary, several tines, according to a conventional method, with respect to the dispersion of the color resin particle subjected to heat treatment under the above conditions in the heating step.

First, in order to remove the dispersion stabilizing agent remaining in the dispersion of the color resin particle after the heat treatment, it is preferable that an acid or an alkali is added to the dispersion of the color resin particle after the heat treatment and washing is performed. When the dispersion stabilizing agent used is a compound soluble in an acid, it is preferable to add an acid to the dispersion of the color resin particle to perform washing, and on the other hand, when the dispersion stabilizing agent used is a compound soluble in an alkali, it is preferable to add an alkali to the dispersion of the color resin particle after the heat treatment to perform washing.

In addition, when a compound soluble in an acid is used as the dispersion stabilizing agent, it is preferable to add an acid to the aqueous dispersion of the color resin particle after the heat treatment, and to adjust the pH to preferably 6.5 or less, more preferably 6 or less. As the acid to be added, inorganic acids such as sulfuric acid, hydrochloric acid, and nitric acid, and organic acids such as formic acid and acetic acid can be used, but sulfuric acid is particularly suitable because the removal efficiency of the dispersion stabilizing agent is large and the burden on the manufacturing facility is small.

As the method of dehydration and filtration, various known methods and the like can be used, and there is no particular limitation. Examples thereof include a centrifugal filtration method, a vacuum filtration method, and a pressure filtration method. Also, the method of drying is not particularly limited, and various methods can be used.

As described above, the color resin particle constituting the toner according to the present invention (color resin particle which is spheroidized by heat treatment, hereinafter referred to as "spherical color resin particle" as appropriate) can be produced.

According to the present invention, since the above steps are adopted, the average circularity of the obtained spherical color resin particle can be preferably as high as 0.950 to 1.000. The average circularity of the spherical color resin particle is more preferably 0.955 to 0.995, further preferably 0.960 to 0.995, and particularly preferably 0.970 to 0.990.

The volume average particle diameter (Dv) of the spherical color resin particle is preferably 5.0 to 11.5 μm, more preferably 5.5 to 10 μm, still more preferably 6.0 to 9.0 μm, and particularly preferably 6.5 to 8.0 μm from the viewpoint of image reproducibility. When the volume average particle diameter (Dv) of the spherical color resin particle is less than the above range, the fluidity of the toner may be lowered, and the image quality may be easily deteriorated due to fogging or the like. On the other hand, when the volume average particle diameter (Dv) of the spherical color resin particle exceeds the above range, the resolution of the obtained image may be lowered.

In addition, the particle size distribution (Dv/Dp), which is a ratio of the volume average particle diameter (Dv) and the number average particle diameter (Dp) of the spherical color resin particle, is preferably 1.00 to 1.40, more preferably 1.10 to 1.30, still more preferably 1.11 to 1.25, and particularly preferably 1.13 to 1.20 from the viewpoint of image reproducibility. When the particle size distribution (Dv/Dp) of the spherical color resin particle exceeds the above ranges, the fluidity of the toner may be lowered, and the image quality of the color resin particle may be easily deteriorated due to fogging or the like. The volume average particle diameter (Dv) and the number average particle diameter (Dp) of the spherical color resin particle can be measured using, for example, a particle size analyzer (manufactured by Beckman Coulter, trade name: Multisizer).

The spherical color resin particle obtained above method may be used as a toner as it is or as a mixture of the spherical color resin particle and carrier particle (such as ferrite and iron powder). To adjust the charging property, fluidity, storage property, and the like of the toner, using a high speed stirrer (such as trade name: FM mixer (manufactured by Nippon Coke & Engineering Co., Ltd.)), an external additive may be added to and mixed with the spherical color resin particle to prepare a one-component toner. Furthermore, the spherical color resin particle and an external additive may be mixed further with carrier particle to prepare a two-component toner.

Stirrers used for external processing are not particularly limited if they are stirrers capable of attaching external additive to the surface of spherical color resin particle. For example, stirrers capable of mixing and agitating such as FM mixer (trade name, manufactured by Nippon Coke & Engineering Co., Ltd.), supermixer (trade name, manufactured by Kawada Seisakusho Co., Ltd.), Q mixer (trade name, manufactured by Nippon Coke & Engineering Co., Ltd.), mechanofusion system (trade name, manufactured by Hosokawa Micron Corporation), and mechanomill (trade name, Okada Seiko Co., Ltd.) may be mentioned.

Examples of the external additive include inorganic fine particles of silica, titanium oxide, aluminum oxide, zinc oxide, tin oxide, calcium carbonate, calcium phosphate, cerium oxide, and the like; organic fine particles of polymethyl methacrylate resins, silicone resins, melamine resins, and the like. Among these, inorganic fine particles are preferred, silica and titanium oxide are more preferred, and silica is particularly preferred. It is preferred that a combination of two or more fine particles be used as the external additive. Note that, each of these external additives can be used alone, but two or more of then are preferably used in combination.

The external additive is preferably used in a proportion of 0.3 to 6 parts by mass, more preferably 1.2 to 3 parts by mass, with respect to 100 parts by mass of the color resin particle.

Since the toner of the present invention is obtained by using the spherical color resin particle obtained by the above method of production as the color resin particle, it can be produced with high productivity, aggregate of color resin particles is effectively suppressed, and it is excellent in balance with fine line reproducibility and blade cleaning property.

EXAMPLES

Hereinafter, the present invention will be more specifically described by way of Examples and Comparative Examples, but the present invention will not be limited only to these Examples. Note that, "part(s)" and "%" are mass-based unless otherwise specified.

The test methods performed in Examples and Comparative Examples are as described below.

(1) Glass Transition Temperature

The glass transition temperature was measured according to ASTM D3418-82.

(2) Acid Value

The acid value was measured according to JIS K 0070, which was a criterion oil and fat analysis method established by the Japan Industrial Standards Committee (JICS).

(3) Volume Average Particle Diameter Dv, Number Average Particle Diameter Dp, and Particle Size Distribution Dv/Dp of Color Resin Particle The volume average particle diameter Dv, number average particle diameter Dp, and particle size distribution Dv/Dp of the color resin particle was measured by using a particle size measurement device (trade name: Multisizer, manufactured by Beckman Coulter, Inc.). The measurement using Multisizer was performed under a condition of an aperture diameter: 100 μm, dispersion medium: Isotone II (trade name) with 10% concentration, number of measured particles: 100,000.

Specifically, about 0.2 g of the color resin particle was weighed and was taken into a beaker, and a surfactant aqueous solution (trade name: dry well, manufactured by Fujifilm Corporation) was added as a dispersant to that beaker. Further, 2 mL of the dispersion medium was added thereto to moisten the color resin particle, then 10 mL of the dispersion medium was added thereto, and it was dispersed for 1 minute with an ultrasonic disperser, and then the measurement was performed with the above particle size measurement device.

(4) Average Circularity of Color Resin Particle

In a container, 10 mL of ion-exchanged water was previously charged, and 0.2 g of a surfactant aqueous solution (trade name: dry well manufactured by Fujifilm Corporation) was added as a dispersant therein, and 0.2 g of the color resin particle was further added thereto, followed by dispersing treatment in an ultrasonic disperser for 60 W and 3 minutes. The concentration of the color resin particle at the time of measurement was adjusted to be 3,000 to 10,000 particles/μL, and 1,000 to 10,000 color resin particles having a circle equivalent diameter of 0.4 μm or more were measured using a flow type particle image analyzer (trade name: FPIA-2100, manufactured by Sysmex). The average circularity was determined from the measured values.

The circularity is shown in the formula below, and the average circularity is its average value.

(Circularity)=(Surrounding length of circle equal to projected area of particle)/(Surrounding length of projected image of particle)

(5) Aggregation State of Color Resin Particles

For the color resin particle, SEM observation was performed, and aggregation state of color resin particles was evaluated on the basis of the following criteria.

Good: No aggregation (all color resin particles were independent of each other.)

Fair: Aggregation was slightly observed (a slight observation was made that two color resin particles were coalesced with each other.).

Poor: Aggregation was remarkable (many color resin particles were coalesced into clumps.).

(6) Fine Line Reproducibility

The toner was placed in a commercially available printer, left in an N/N environment for one day, and then a line image was continuously formed by a 2×2 dot line (width: about 85 μm), and printing was performed up to 10,000 sheets. The movement speed of the surface of the photosensitive member at a position into contact with the cleaning blade was set at 12 cm/sec.

For every 500 prints, the density distribution data of the line image was obtained by performing a measurement using a print evaluation system (trade name: RT2000, manufactured by YA-MA Corporation). At this time, defining the full width at half maximum of the concentration of as a line width, and the line width of the first line image as a reference, it is assumed that the first line image is reproduced if the difference in line width to the line width of the first line image is 10 μm or less, the number of sheets in which the difference in line width of the line image can be maintained at 10 μm or less was examined. The results were divided into three stages, that is, those of 10,000 or more fine lines maintained were to be "Good", those of less than 5000 sheets were to be "Poor", those of 5,000 to 10,000 sheets in the middle thereof were to be "Fair".

(7) Blade Cleaning Property

A test cleaning blade sample was attached to a commercially available printer, toner was placed in a cartridge, printing paper was set, and then left to stand overnight in an N/N environment. Thereafter, continuous printing was carried out at 5% density from the initial stage, and the photosensitive member and the charging roller were visually observed every 500 sheets of printing to test whether or not streaks (filming) occurred due to a cleaning failure, and whether or not the occurrence of a cleaning failure was tested up to 10,000 sheets of printing. The test results showed the number of printed sheets in which the cleaning failure occurred. The test result of 10,000 sheets indicated that the cleaning failure did not occur even if 10,000 sheets were printed consecutively.

(8) Minimum Fixing Temperature of Toner

A fixing test was carried out using a commercially available nonmagnetic single component development printer (printing speed of 20 ppm) which was modified so that the temperature of the fixing roll part of could be changed. The fixing test was carried out by printing a solid black (100% printing density) and changing the temperature of the fixing roll of the modified printer by 5° C., measuring the fixing rate of the toner at each temperature, and obtaining the relationship between the temperature and the fixing rate. The fixing rate was calculated from the ratio of the image density before and after tape peeling by performing tape peeling in a printing region of black solid (printing density 100%). In other words, assuming that the image density before tape peeling is an ID (before) and the image density after tape peeling is an ID (after), the fixing ratio can be calculated by the following calculation formula.

$$\text{Fixation ratio }(\%)=(ID(\text{after})/ID(\text{before}))\times 100$$

Here, the tape peeling operation was a series of operations in which an adhesive tape (manufactured by Sumitomo 3M Limited, trade name: Scotch-Mending Tape 810-3-18) was attached to a measurement portion of a test paper, the adhesive tape was adhered by pressing at a constant pressure, and then the adhesive tape was peeled in a direction along the paper at a constant speed. Further, the image density was measured using a reflectance type image densitometer (trade name: RD914, manufactured by Macbeth Co., Ltd.) In this fixing test, the minimum fixing temperature of the fixing roll having a fixing ratio exceeding 80% was defined as the minimum fixing temperature of the toner. The minimum fixing temperature of the toner was evaluated for Examples 2-1 to 2-7 and Comparative Example 2-1.

(9) Evaluation of Heat-Resistant Storage Property of Toner

After 10 g of toner was placed in a 100 mL polyethylene container and sealed, the container was submerged in a constant temperature water bath set at a predetermined temperature, and was taken out after 8 hours had elapsed. The toner was transferred on the screen of 42 meshes from the container which was taken out so as not to give vibration as much as possible, it was set on a powder measurement device (manufactured by Hosokawa Micron Corporation, trade name: powder tester PT-R). The amplitude of the sieve was set to 1.0 nm, and after the sieve was vibrated for 30 seconds, the mass of the toner remaining on the sieve was measured, which was taken as the mass of the aggregated toner.

The maximum temperature at which the mass of the agglomerated toners was 0.5 g or less was determined as the heat-resistant temperature. The evaluation of heat-resistant storage property of toner was performed for Examples 2-1 to 2-7 and Comparative Example 2-1.

(10) Jetting after High-Temperature Storage

The toner for evaluation was filled in a commercially available nonmagnetic single-component developing type toner cartridge, and then left in an environment of 50° C. for 120 hours. After leaving, continuous printing was performed for 2 hours with a commercially available nonmagnetic single-component developing system printer, and the toner was visually checked for jetting, and the evaluation was performed according to the following criteria. The evaluation of jetting after high-temperature storage was performed for Examples 2-1 to 2-7 and Comparative Example 2-1.

Very Good: There was no jetting at all.

Good: There was a slight jetting from a part of the developer.

Fair: There was a slight jetting from the entire surface of the developer.

Poor: Severe jetting occurred from a part of the developer.

Very Poor: Severe jetting occurred from the entire surface of the developer.

Production Example 1, Production of Polyester Resin (A-1)

386 g (1.1 mol) of polyoxypropylene (2)-2,2-bis(4-hydroxyphenyl)propane, 327 g (1.0 mol) of polyoxyethylene (2)-2,2-bis (4-hydroxyphenyl)propane, 36 g (0.1 mol) of 8-ethyloctadecanedioic acid (trade name: SB-20, manufactured by Okamura Oil Mill, Ltd.), 222.4 g (1.34 mol) of terephthalic acid, 46.1 g (0.24 mol) of trimellitic anhydride, and 1.1 g of di-n-butyltin oxide were placed in a 2 liter glass four necked flask, and a thermometer, a stir bar, a downstream condenser and a nitrogen inlet tube were mounted and allowed to react under a stream of nitrogen at 220° C. in an electric heating mantle while mixing. After the start of the reaction, the degree of polymerization was investigated from the ring and boll softening point (SP), and the polycondensation reaction was terminated when the softening point reached 130° C., thereby obtaining a polyester resin (A-1). The glass transition temperature of the obtained polyester resin (A-1) was 53° C., and the acid value was 4 mgKOH/g.

Production Example 2, Production of Polyester Resin (A-2)

351 g (1.0 mol) of polyoxypropylene (2)-2,2-bis(4-hydroxyphenyl)propane, 327 g (1.0 mol) of polyoxyethylene (2)-2,2-bis(4-hydroxyphenyl)propane, 72 g (0.2 mol) of 8-ethyloctadecanedioic acid (trade name: SB-20, manufactured by Okamura Oil Mill, Ltd.), 222.4 g (1.34 mol) of terephthalic acid, 46.1 g (0.24 mol) of trimellitic anhydride, and 1.1 g of di-n-butyltin oxide were placed in a 2 liter glass four necked flask, and a thermometer, a stir bar, a downstream condenser and a nitrogen inlet tube were mounted and allowed to react under a stream of nitrogen at 220° C. in an electric heating mantle while mixing. After the start of the reaction, the degree of polymerization was investigated from the ring and boll softening point (SP), and the polycondensation reaction was terminated when the softening point reached 130° C., thereby obtaining a polyester resin (A-2). The glass transition temperature of the obtained polyester resin (A-2) was 50° C., and the acid value was 0.1 mgKOH/g.

Production Example 3, Production of Polyester Resin (A-3)

Except that the amount of polyoxypropylene (2)-2,2-bis (4-hydroxyphenyl)propane was changed to 527 g (1.5 ml) and the amount of polyoxyethylene (2)-2,2-bis(4-hydroxyphenyl)propane was changed to 164 g (0.5 ml) respectively, a polyester resin (A-3) was obtained in the same manner as in Production Example 2. The glass transition temperature of the obtained polyester resin (A-3) was 58° C., and the acid value was 0.2 mgKOH/g.

Production Example 4, Prcduction of Acrylic Resin (B-1)

200 parts of toluene was charged into the reaction vessel, and the inside of the reaction vessel was sufficiently replaced with nitrogen while stirring toluene, and then the temperature was raised to 90° C., and then a mixed solution of 96.2 parts of methyl methacrylate, 3.5 parts of n-ethyl acrylate, 0.4 parts of acrylic acid, and 3 parts of t-butylperoxy-2-ethylhexanoate (trade name: perbutyl O, manufactured by NOF Corporation) was added dropwise into the reaction vessel over a period of 2 hours. Further, by holding under toluene reflux for 10 hours, polymerization was completed, and then the solvent was distilled and removed under reduced pressure to obtain an acrylic resin (B-1). The obtained acrylic resin (B-1) had a glass transition temperature of 74.6° C., an acid value of 3.1 mgKOH/g, and a weight average molecular weight MW (a value in terms of polystyrene measured by gel permeation chromatography (GPC) using tetrahydrofuran, hereinafter, similarly.) of 10,000.

Production Example 5, Production of Acrylic Resin (B-2)

Except that the amount of methyl methacrylate was changed to 92.8 parts and the amount of n-ethyl acrylate was changed to 6.8 parts respectively, an acrylic resin (B-2) was obtained in the same manner as in Production Example 4. The obtained acrylic resin (B-2) had a glass transition temperature of 65.1° C., an acid value of 3.1 mgKOH/g, and a weight average molecular weight MW of 10, 700.

Production Example 6, Production of Acrylic Resin (B-3)

Except that the amount of methyl methacrylate was changed to 89.8 parts and the amount of n-ethyl acrylate was changed to 9.8 parts respectively, an acrylic resin (B-3) was obtained in the same manner as in Production Example 4. The obtained acrylic resin (B-3) had a glass transition temperature of 54.8° C., an acid value of 3.1 mgKOH/g, and a weight average molecular weight MW of 11,600.

Production Example 7, Production of Colloidal Dispersion Containing Colloidal Particle of Magnesium Hydroxide An aqueous solution in which 7.3 parts of sodium hydroxide was dissolved in 50 parts of ion-exchanged water was gradually added to an aqueous solution in which 10.4 parts of magnesium chloride was dissolved in 280 parts of ion-exchanged water under stirring so as to prepare a colloidal dispersion containing colloidal particle of magnesium hydroxide.

Preparation Example 8, Production of Colloidal Dispersion Containing Colloidal Particle of Calcium Phosphate An aqueous solution in which 15 parts of sodium phosphate was dissolved in 50 parts of ion-exchanged water was gradually added to an aqueous solution in which 18 parts of calcium chloride was dissolved in 280 parts of ion-exchanged water under stirring so as to prepare a colloidal dispersion containing colloidal particle of calcium phosphate.

Example 1-1

Production of Color Resin Particle Before Heat Treatment

As a binder resin, 100 parts of the polyester resin (A-1) obtained in Production Example 1, 5 parts of carbon black (trade name: MA-100, manufactured by Mitsubishi Chemical Corporation) as a colorant, 10 parts of an ester wax (behenyl stearate) as a release agent, and 3 parts of a charge control resin (a styrene-acrylic resin containing a sulfonic group, a functional group content of 2.5%, manufactured by Fujikura Kasei Co., Ltd.) as a charge control agent were mixed by a Henschel mixer (trade name: FM20B, manufactured by Nippon Coke & Engineering Company, Limited). The resulting mixture was then melt-kneaded using a twin-axis extruder and the resulting kneaded product was cooled. Next, the cooled kneaded product was pulverized by a mechanical pulverizer (manufactured by Turbo Industrials, Inc., trade name: Turbo Mill) and classified by an elbow jet classifier (manufactured by Nittetsu Mining Co., Ltd., trade name: EJ-LABO), thereby obtaining irregular shaped color resin particle before heat treatment having a volume average particle diameter of 7.8 μm. Then, the glass transition temperature, the volume average particle diameter Dv, the number average particle diameter Dp, the particle size distribution Dv/Dp, the average circularity, and the aspect ratio of the obtained color resin particle before heat treatment were measured. The results are shown in Table 1.

Spheroidization of Color Resin Particle Before Heat Treatment 0.2 parts of the color resin particle before heat treatment obtained above, 4.0 parts of the colloidal dispersion containing colloidal particle of magnesium hydroxide obtained in Production Example 7, and 4.0 parts of ion-exchanged water were mixed so as to prepare a mixed solution, and the resulting mixed solution was subjected to an ultrasonic treatment at a temperature of 25° C. for 30 minutes to obtain a dispersion of the color resin particle before heat treatment. Then, a sample tube containing a stir bar was installed in a constant temperature water tank set at a temperature of 90° C., and the dispersion of the color resin particle before heat treatment obtained above was placed in the sample tube, and the dispersion was allowed to stand for 30 minutes while slowly stirring, whereby heat treatment of the dispersion of the color resin particle before heat treatment was performed so as to spheroidize the color resin particle before heat treatment.

Then, while stirring the dispersion of the spherical color resin particle after the heat treatment, sulfuric acid was added until the pH became 4.5, and acid washing was performed under conditions of a temperature of 25° C. for 10 minutes, and then the spherical color resin particle was filtered off by filtration, washed with water, and then washed water was filtered. The electrical conductivity of the filtrate at this time was 20 μS/an. In addition, spherical color resin particle in a dry state was obtained by performing dehydration and drying on the spherical color resin particle after washing and filtration. Then, the spherical color resin particle was used to measure and evaluate the volume average particle diameter Dv, the number average particle diameter Dp, the particle size distribution Dv/Dp, the average circularity, and the aggregation states. The results are shown in Table 1.

Production of Toner

To 100 parts of the spherical color resin particle obtained above, 0.5 parts of silica fine particle having a volume average particle diameter of 12 nm subjected to hydrophobization treatment with hexamethyldisilazane, 2.0 parts of silica fine particle having a volume average particle diameter of 40 nm subjected to hydrophobization treatment with hexamethyldisilazane, and 0.5 parts of titanium oxide fine particle surface-treated with tin oxide doped with antimony having a specific resistance of 40 Ω·cm were acted, and the mixture was mixed using a Henschel mixer to obtain a toner. Then, the fine line reproducibility and the blade cleaning property were evaluated using the obtained toner. The results are shown in Table 1.

Example 1-2

Except that the amount of the colloidal dispersion containing colloidal particle of magnesium hydroxide obtained in Production Example 7 was changed to 0.4 parts, a spherical color resin particle and toner were obtained in the same manner as in Example 1-1, and evaluation was performed in the same manner. The results are shown in Tables 1-1 to 1-3.

Example 1-3

Except that the ultrasonic treatment time was changed to 10 minutes, a spherical color resin particle and toner were obtained in the same manner as in Example 1-1, and evaluation was performed in the same manner. The results are shown in Tables 1-1 to 1-3.

Example 1-4

Except that the heat treatment time of the dispersion of the color resin particle before heat treatment was changed to 15 minutes, a spherical color resin particle and toner were obtained in the same manner as in Example 1-1, and evaluation was performed in the same manner. The results are shown in Tables 1-1 to 1-3.

Example 1-5

Except that the heat treatment time of the dispersion of the color resin particle before heat treatment was changed to 1 hour, a spherical color resin particle and toner were obtained in the same manner as in Example 1-1, and evaluation was performed in the same manner. The results are shown in Tables 1-1 to 1-3.

Example 1-6

Except that the heat treatment time of the dispersion of the color resin particle before heat treatment was changed to 3 hours, a spherical color resin particle and toner were obtained in the same manner as in Example 1-1, and evaluation was performed in the same manner. The results are shown in Tables 1-1 to 1-3.

Example 1-7

Except that the heat treatment time of the dispersion of the color resin particle before heat treatment was changed to 5 hours, a spherical color resin particle and toner were obtained in the same manner as in Example 1-1, and evaluation was performed in the same manner. The results are shown in Tables 1-1 to 1-3.

Example 1-8

Except that the heat treatment temperature of the dispersion of the color resin particle before heat treatment was changed to 60° C., a spherical color resin particle and toner were obtained in the same manner as in Example 1-1, and evaluation was performed in the same manner. The results are shown in Tables 1-1 to 1-3.

Example 1-9

Except that the heat treatment temperature of the dispersion of the color resin particle before heat treatment was changed to 70° C., a spherical color resin particle and toner were obtained in the same manner as in Example 1-1, and evaluation was performed in the same manner. The results are shown in Tables 1-1 to 1-3.

Example 1-10

Except that the heat treatment temperature of the dispersion of the color resin particle before heat treatment was changed to 80° C., a spherical color resin particle and toner were obtained in the same manner as in Example 1-1, and evaluation was performed in the same manner. The results are shown in Tables 1-1 to 1-3.

Example 1-11

Except that the colloidal dispersion containing colloidal particle of magnesium hydroxide obtained in Production Example 7 was changed to the colloidal dispersion containing colloidal particle of calcium phosphate obtained in Production Example 8, a toner was obtained in the same manner as in Example 1-1, and evaluation was performed in the same manner. The results are shown in Tables 1-1 to 1-3.

Comparative Example 1-1

Except that a dispersion of the color resin particle before heat treatment was prepared by dispersing using a stirrer (stir bar) instead of dispersing by ultrasonic treatment, a spherical color resin particle and toner were obtained in the same manner as in Example 1-1, and evaluation was performed in the same manner. The results are shown in Tables 1-1 to 1-3.

Comparative Example 1-2

Except that the color resin particle before heat treatment obtained in the same manner as in Example 1-1 were used as they were without performing dispersing treatment and heat treatment, a toner was obtained in the same manner as in Example 1-1, and evaluation was performed in the same manner. The results are shown in Tables 1-1 to 1-3.

TABLE 1-1

| | Dispersing step | | | | | | Heating step | |
|---|---|---|---|---|---|---|---|---|
| | Formulation | | | | Dispersing conditions | | Heat conditions | |
| | Toner [g] | Type of colloid | Colloidal dispersion [g] | Ion-exchanged water [g] | Dispersion time | Dispersing method | Heat temperature [° C.] | Heat time |
| Eaxmple 1-1 | 0.2 | Magnesium hydroxide | 4 | 4 | 30 min | Ultrasonic | 90 | 30 min |
| Eaxmple 1-2 | 0.2 | Magnesium hydroxide | 0.4 | 4 | 30 min | Ultrasonic | 90 | 30 min |
| Eaxmple 1-3 | 0.2 | Magnesium hydroxide | 4 | 4 | 10 min | Ultrasonic | 90 | 30 min |
| Eaxmple 1-4 | 0.2 | Magnesium hydroxide | 4 | 4 | 30 min | Ultrasonic | 90 | 15 min |
| Eaxmple 1-5 | 0.2 | Magnesium hydroxide | 4 | 4 | 30 min | Ultrasonic | 90 | 1 h |
| Eaxmple 1-6 | 0.2 | Magnesium hydroxide | 4 | 4 | 30 min | Ultrasonic | 90 | 3 h |
| Eaxmple 1-7 | 0.2 | Magnesium hydroxide | 4 | 4 | 30 min | Ultrasonic | 90 | 5 h |
| Eaxmple 1-8 | 0.2 | Magnesium hydroxide | 4 | 4 | 30 min | Ultrasonic | 60 | 30 min |
| Eaxmple 1-9 | 0.2 | Magnesium hydroxide | 4 | 4 | 30 min | Ultrasonic | 70 | 30 min |
| Eaxmple 1-10 | 0.2 | Magnesium hydroxide | 4 | 4 | 30 min | Ultrasonic | 80 | 30 min |
| Eaxmple 1-11 | 0.2 | Calcium phosphate | 4 | 4 | 30 min | Ultrasonic | 90 | 30 min |
| Comparative Eaxmple 1-1 | 0.2 | Magnesium hydroxide | 4 | 4 | 30 min | Stirrer | 90 | 30 min |
| Comparative Eaxmple 1-2 | Not performing dispersing step | | | | | | Not performing heat treatment | |

TABLE 1-2

| | Heating step Heat conditions | | Color resin particle before heat treatment | | | | | |
|---|---|---|---|---|---|---|---|---|
| | Heat temperature [° C.] | Heat time | Type of binder | Tg of color resin particle [° C.] | Dv [μm] | Dp [μm] | Dv/Dp | Average circularity |
| Eaxmple 1-1 | 90 | 30 min | Polyester | 54 | 8.2 | 7.1 | 1.15 | 0.940 |
| Eaxmple 1-2 | 90 | 30 min | Polyester | 54 | 8.2 | 7.1 | 1.15 | 0.940 |
| Eaxmple 1-3 | 90 | 30 min | Polyester | 54 | 8.2 | 7.1 | 1.15 | 0.940 |
| Eaxmple 1-4 | 90 | 15 min | Polyester | 54 | 8.2 | 7.1 | 1.15 | 0.940 |
| Eaxmple 1-5 | 90 | 1 h | Polyester | 54 | 8.2 | 7.1 | 1.15 | 0.940 |
| Eaxmple 1-6 | 90 | 3 h | Polyester | 54 | 8.2 | 7.1 | 1.15 | 0.940 |
| Eaxmple 1-7 | 90 | 5 h | Polyester | 54 | 8.2 | 7.1 | 1.15 | 0.940 |
| Eaxmple 1-8 | 60 | 30 min | Polyester | 54 | 8.2 | 7.1 | 1.15 | 0.940 |
| Eaxmple 1-9 | 70 | 30 min | Polyester | 54 | 8.2 | 7.1 | 1.15 | 0.940 |
| Eaxmple 1-10 | 80 | 30 min | Polyester | 54 | 8.2 | 7.1 | 1.15 | 0.940 |
| Eaxmple 1-11 | 90 | 30 min | Polyester | 54 | 8.2 | 7.1 | 1.15 | 0.940 |
| Comparative Eaxmple 1-1 | 90 | 30 min | Polyester | 54 | 8.2 | 7.1 | 1.15 | 0.940 |
| Comparative Eaxmple 1-2 | Not performing heat treatment | | Polyester | 54 | 8.2 | 7.1 | 1.15 | 0.940 |

TABLE 1-3

| | Spherical color resin particle | | | | Evaluation | | |
|---|---|---|---|---|---|---|---|
| | Dv [μm] | Dp [μm] | Dv/Dp | Average circularity | Aggregation of color resin particles | Fine line reproducibility | Blade cleaning property |
| Eaxmple 1-1 | 8.4 | 7.2 | 1.16 | 0.955 | Good | Good | Good |
| Eaxmple 1-2 | 11.1 | 7.4 | 1.50 | 0.948 | Fair | Fair | Very Good |
| Eaxmple 1-3 | 8.3 | 7.2 | 1.16 | 0.963 | Fair | Good | Good |
| Eaxmple 1-4 | 8.4 | 7.2 | 1.17 | 0.970 | Fair | Good | Good |
| Eaxmple 1-5 | 8.3 | 7.3 | 1.15 | 0.960 | Good | Good | Good |
| Eaxmple 1-6 | 9.5 | 7.2 | 1.32 | 0.971 | Good | Very Good | Fair |
| Eaxmple 1-7 | 8.4 | 7.0 | 1.20 | 0.981 | Good | Very Good | Fair |
| Eaxmple 1-8 | 8.3 | 7.1 | 1.16 | 0.944 | Good | Fair | Very Good |
| Eaxmple 1-9 | 8.2 | 7.1 | 1.15 | 0.955 | Good | Good | Good |
| Eaxmple 1-10 | 8.3 | 7.2 | 1.15 | 0.967 | Good | Good | Good |
| Eaxmple 1-11 | 8.4 | 7.2 | 1.16 | 0.970 | Fair | Good | Good |
| Comparative Eaxmple 1-1 | Unevaluable | | | — | Poor | Unevaluable | Unevaluable |
| Comparative Eaxmple 1-2 | — | — | — | — | Good | Poor | Very Good |

As shown in Tables 1-1 to 1-3, by performing a dispersing treatment in which a cavitation effect was obtained on a color resin particle in an aqueous dispersion medium, a dispersion of the color resin particle is obtained, and the obtained dispersion of the color resin particle is subjected to a heat treatment at a temperature of equal to or more than a glass transition temperature of the color resin particle and 95° C. or less for a heating time of 5 minutes or more and 10 hours or less, whereby the average circularity of the color resin particle can be appropriately increased (spheronization of the color resin particle can be appropriately promoted), and while suppressing aggregation of the color resin particles, the fine line reproducibility and the blade cleaning property can be excellent in balance (Examples 1-1 to 1-11).

On the other hand, when the dispersing treatment was performed by a method in which the cavitation effect was not obtained, aggregate of the color resin particles became remarkable due to the heat treatment, so that it could not be used as a toner (Comparative Example 1-1).

In addition, when the dispersing treatment in which a cavitation effect was obtained and the subsequent heat treatment were not performed, the obtained toner was inferior in fine line reproducibility (Comparative Example 1-2).

Example 2-1

Production of Color Resin Particle Before Heat Treatment

As a binding resin, 100 parts of the polyester resin (A-2) obtained in Production Example 2, as a colorant, 5 parts of carbon black (trade name: MA-100, manufactured by Mitsubishi Chemical Corporation)) as a colorant, 10 parts of an ester wax (behenyl stearate, melting point: 70° C.) as a release agent, 3 parts of a charge control resin (trade name: FCA-630, manufactured by Fujikura Kasei Co., Ltd.) as a charge control agent, and 2 parts of the acrylic resin (B-1) obtained in Production Example 4 as a polar resin were mixed by a Henschel mixer (trade name: FM20B, manufactured by Nippon Coke & Engineering Company, Limited). The resulting mixture was then melt-kneaded using a twin-axis extruder and the resulting kneaded product was cooled.

Next, the cooled kneaded product was pulverized by a mechanical pulverizer (manufactured by Turbo Industrials, Inc., trade name: Turbo Mill) and classified by an elbow jet classifier (manufactured by Nittetsu Mining Co., Ltd., trade name: EJ-LABO), thereby obtaining irregular shaped color resin particle before heat treatment having a volume average particle diameter of 7.8 μm.

Spheroidization of Color Resin Particle Before Heat Treatment 0.2 parts of the color resin particle before heat treatment obtained above, 4.0 parts of the colloidal dispersion containing colloidal particle of magnesium hydroxide obtained in Production Example 7, and 4.0 parts of ion-exchanged water were mixed so as to prepare a mixed solution, and the resulting mixed solution was subjected to an ultrasonic treatment at a temperature of 25° C. for 30 minutes to obtain a dispersion of the color resin particle before heat treatment. Then, a sample tube containing a stir bar was installed in a constant temperature water tank set at a temperature of 80° C., and the dispersion of the color resin particle before heat treatment obtained above was placed in the sample tube, and the dispersion was allowed to stand for 30 minutes while slowly stirring, whereby heat treatment of the dispersion of the color resin particle before heat treatment was performed so as to obtain a spherical color resin particle before heat treatment.

Then, while stirring the dispersion of the spherical color resin particle after the heat treatment, sulfuric acid was added until the pH became 4.5 or less, and acid washing was performed under conditions of a temperature of 25° C. for 10 minutes, and then the spherical color resin particle was filtered off by filtration, washed with water, and then washed water was filtered. The electrical conductivity of the filtrate at this time was 20 μS/an. In addition, spherical color resin particle in a dry state was obtained by performing dehydration and drying on the spherical color resin particle after washing and filtration. Then, the spherical color resin particle was used to measure the average circularity, and the aggregation states. The results are shown in Table 2.

Production of Toner

To 100 parts of the spherical color resin particle obtained above, 0.5 parts of silica fine particle having a volume average particle diameter of 12 nm subjected to hydrophobization treatment with hexamethyldisilazane (manufactured by Nippon Aerosil Co. Ltd., trade name: RX-200), 2.0 parts of silica fine particle having a volume average particle diameter of 40 nm subjected to hydrophobization treatment with hexamethyldisilazane (manufactured by Nippon Aerosil Co. Ltd., trade name: RX-50), and 0.5 parts of titanium oxide fine particle surface-treated with tin oxide doped with antimony having a specific resistance of 40 Ω·cm (manufactured by Titan Kogyo, Ltd., trade name: EC-300, volume average particle diameter: 0.3 μm) were added, and the mixture was mixed using a Henschel mixer for 10 minutes at a rotational speed of 3000 rpm to obtain a toner. Then, the fine line reproducibility, blade cleaning property, minimum fixing temperature, heat-resistant storage property, and jetting after high-temperature storage were evaluated using the obtained toner. The results are shown in Table 2.

Example 2-2

Except that the amount of the acrylic resin (B-1) obtained in Production Example 4 was changed to 0.5 parts in obtaining a color resin particle before heat treatment, a color resin particle before heat treatment was obtained in the same manner as in Example 2-1. The volume average particle diameter of the obtained color resin particle before heat treatment was 7.7 μm. Then, except that the obtained color resin particle before heat treatment was used, a spherical color resin particle and toner were obtained in the same manner as in Example 2-1, and evaluation was performed in the same manner. The results are shown in Table 2.

Example 2-3

Except that the amount of the acrylic resin (B-1) obtained in Production Example 4 was changed to 5 parts in obtaining a color resin particle before heat treatment, a color resin particle before heat treatment was obtained in the same manner as in Example 2-1. The volume average particle diameter of the obtained color resin particle before heat treatment was 7.5 μm. Then, except that the obtained color resin particle before heat treatment was used, a spherical color resin particle and toner were obtained in the same manner as in Example 2-1, and evaluation was performed in the same manner. The results are shown in Table 2.

Example 2-4

Except that 2 parts of the acrylic resin (B-2) obtained in Production Example 5 was used instead of the acrylic resin (B-1) obtained in Production Example 4 in obtaining a color resin particle before heat treatment, a color resin particle before heat treatment was obtained in the sane manner as in Example 2-1. The volume average particle diameter of the obtained color resin particle before heat treatment was 7.5 μm. Then, except that the obtained color resin particle before heat treatment was used, a spherical color resin particle and toner were obtained in the same manner as in Example 2-1, and evaluation was performed in the same manner. The results are shown in Table 2.

Example 2-5

Except that 100 parts of the polyester resin (A-3) obtained in Production Example 3 was used instead of the polyester resin (A-2) obtained in Production Example 2 in obtaining a color resin particle before heat treatment, a color resin particle before heat treatment was obtained in the same manner as in Example 2-1. The volume average particle diameter of the obtained color resin particle before heat treatment was 7.4 μm. Then, except that the obtained color resin particle before heat treatment was used, a spherical color resin particle and toner were obtained in the same manner as in Example 2-1, and evaluation was performed in the same manner. The results are shown in Table 2.

Example 2-6

Except that the heat treatment time of the dispersion of the color resin particle before heat treatment was changed to 60 minutes, a spherical color resin particle and toner were obtained in the same manner as in Example 2-1, and evaluation was performed in the same manner. The results are shown in Table 2.

Example 2-7

Except that the heat treatment time of the dispersion of the color resin particle before heat treatment was changed to 10 minutes, a spherical color resin particle and toner were obtained in the same manner as in Example 2-1, and evaluation was performed in the same manner. The results are shown in Table 2.

Comparative Example 2-1

Except that the color resin particle before heat treatment obtained in the same manner as in Example 2-1 were used as they were without dispersing treatment and heat treatment, a spherical color resin particle and toner were obtained in the same manner as in Example 2-1, and evaluation was performed in the same manner. The results are shown in Table 2.

Further, in Examples 2-1 to 2-7, a resin having a glass transition temperature of 40 to 70° C. was used as a binder resin, and a polar resin having an acid value of 0.5 to 7.0 mgKOH/g (specifically, an acrylic resin having an acid value of 0.5 to 7.0 mgKOH/g) and having a glass transition temperature of 10 to 30° C. higher than that of the binder resin was further contained, so that the obtained toner for electrostatic-image development was excellent in low-temperature fixing property and heat-resistant storage property, and the occurrence of toner jetting after standing at a high temperature was able to be appropriately suppressed.

On the other hand, even when a polar resin having an acid value of 0.5 to 7.0 mgKOH/g was further contained, when a dispersing treatment in which a cavitation effect was obtained and a subsequent heat treatment were not performed, the obtained toner became inferior in fine line reproducibility (Comparative Example 2-1).

TABLE 2

| | Type of binder | Type of polar resin | Amount of polar resin to 100 parts of binder resin [parts] | Number volume average particle diameter of color resin particle before heat treatment [μm] | Heat conditions: Heat temperature [° C.] | Heat conditions: Heat time |
|---|---|---|---|---|---|---|
| Example 2-1 | Polyester resin (A-2) Tg = 50° C. | Acrylic resin (B-1) Tg = 74.6° C. | 2 | 7.8 | 80 | 30 |
| Example 2-2 | Polyester resin (A-2) Tg = 50° C. | Acrylic resin (B-1) Tg = 74.6° C. | 0.5 | 7.7 | 80 | 30 |
| Example 2-3 | Polyester resin (A-2) Tg = 50° C. | Acrylic resin (B-1) Tg = 74.6° C. | 5 | 7.5 | 80 | 30 |
| Example 2-4 | Polyester resin (A-2) Tg = 50° C. | Acrylic resin (B-1) Tg = 65.1° C. | 2 | 7.5 | 80 | 30 |
| Example 2-5 | Polyester resin (A-3) Tg = 58° C. | Acrylic resin (B-1) Tg = 74.6° C. | 2 | 7.4 | 80 | 30 |
| Example 2-6 | Polyester resin (A-2) Tg = 50° C. | Acrylic resin (B-1) Tg = 74.6° C. | 2 | 7.8 | 80 | 60 |
| Example 2-7 | Polyester resin (A-2) Tg = 50° C. | Acrylic resin (B-1) Tg = 74.6° C. | 2 | 7.8 | 80 | 10 |
| Comparative Example 2-1 | Polyester resin (A-2) Tg = 50° C. | Acrylic resin (B-1) Tg = 74.6° C. | 2 | 7.8 | Not performing heat treatment | |

Evaluation

| | Average circularity | Aggregation of color resin particle | Fine line reproducibility | Blade cleaning property | Minimum fixing temperature [° C.] | Heat-resistant storage property [° C.] | Jetting after storage at 50° C. for 5 days |
|---|---|---|---|---|---|---|---|
| Example 2-1 | 0.964 | Good | Good | Good | 130 | 58 | Very Good |
| Example 2-2 | 0.963 | Good | Good | Good | 130 | 56 | Fair |
| Example 2-3 | 0.964 | Good | Good | Good | 145 | 60 | Very |
| Example 2-4 | 0.967 | Good | Good | Good | 125 | 55 | Good |
| Example 2-5 | 0.960 | Good | Good | Good | 140 | 60 | Very Good |
| Example 2-6 | 0.974 | Good | Very Good | Fair | 130 | 58 | Very Good |
| Example 2-7 | 0.948 | Good | Fair | Very Good | 130 | 56 | Fair |
| Comparative Example 2-1 | 0.938 | Good | Poor | Very Good | 140 | 51 | Very Poor |

As shown in Table 2, by performing a dispersing treatment in which a cavitation effect was obtained on the color resin particle in an aqueous dispersion medium, a dispersion of the color resin particle is obtained, and the obtained dispersion of the color resin particle is subjected to a heat treatment at a temperature of equal to or more than a glass transition temperature of the color resin particle and 95° C. or less for a heating time of 5 minutes or more and 10 hours or less, whereby the average circularity of the color resin particle can be appropriately increased (spheronization of the color resin particle can be appropriately promoted), and while suppressing aggregation of the color resin particle, the fine line reproducibility and the blade cleaning property can be excellent in balance (Examples 2-1 to 2-7).

The invention claimed is:

1. A method for producing a toner for electrostatic-image development comprising:

a dispersing step of performing a dispersing treatment in which a cavitation effect is obtained on a color resin particle containing a binder resin, a colorant, a charge control agent, a release agent, and a polar resin with an acid value of 0.5 to 7.0 mgKOH/g in an aqueous dispersion medium so as to obtain a dispersion of the color resin particle; and a heating step of performing a heat treatment on the dispersion of the color resin particle at a temperature of equal to or more than a glass transition temperature of the color resin particle and 95° C. or less for a heating time of 5 minutes or more and 10 hours or less, wherein the binder resin is a polyester resin obtained by condensation polymerization of a diol component and a divalent acid component an acid value of the binder resin is 0.0 to 0.4 mgKOH/g, and the binder resin has a glass transition temperature of 50 to 60° C., and the polar resin is a copolymer of an acrylic acid ester and/or a methacrylic acid ester with acrylic acid and/or methacrylic acid.

2. The method for producing a toner for electrostatic-image development according to claim 1, wherein the method further comprises a colloidal dispersion preparation step of reacting an alkali metal hydroxide salt and/or an alkaline earth metal hydroxide salt with a water-soluble polyvalent metal salt (excluding the alkaline earth metal hydroxide salt) in an aqueous medium so as to prepare a colloidal dispersion containing a metal hydroxide colloidal particle which is poorly water-soluble, and the dispersing step is a step of performing the dispersing treatment in which a cavitation effect is obtained on the color resin particle in the colloidal dispersion containing the metal hydroxide colloidal particle.

3. The method for producing a toner for electrostatic-image development according to claim 2, wherein an amount of the colloidal dispersion is set to 100 parts by mass or more with respect to 100 parts by mass of the color resin particle in the dispersing step.

4. The method for producing a toner for electrostatic-image development according to claim 2, wherein in the colloidal dispersion preparation step, an amount of the alkali metal hydroxide salt and/or the alkaline earth metal hydroxide salt is set to an amount in which a chemical equivalent ratio b/a of a chemical equivalent "b" of the alkali metal hydroxide salt and/or the alkaline earth metal hydroxide salt with respect to a chemical equivalent "a" of the water-soluble polyvalent metal salt satisfies a relationship of $0.3 \leq b/a \leq 1.0$.

5. The method for producing a toner for electrostatic-image development according to claim 2, wherein the water-soluble polyvalent metal salt is at least one selected from a magnesium metal salt, a calcium metal salt, and an aluminum metal salt.

6. The method for producing a toner for electrostatic-image development according to claim 1, wherein the color resin particle is obtained by pulverizing a kneaded product, the kneaded product being obtained by mixing the binder resin, the colorant, the charge control agent, and the release agent and then kneading a mixture thereof under heating.

7. The method for producing a toner for electrostatic-image development according to claim 1, wherein the dispersing step is a step of dispersing a color resin particle containing the binder resin, the colorant, the charge control agent, the release agent, and the polar resin and having a number volume average particle diameter of 5.0 to 12.0 μm in an aqueous dispersion medium, and the polar resin has a glass transition temperature of 10 to 30° C. higher than the glass transition temperature of the binder resin.

8. The method for producing a toner for electrostatic-image development according to claim 7, wherein the polar resin has a weight average molecular weight of 6,000 to 50,000 and a glass transition temperature of 60 to 85° C.

9. The method for producing a toner for electrostatic-image development according to claim 1, wherein the release agent has a melting point of 60 to 100° C.

10. The method for producing a toner for electrostatic-image development according to claim 7, wherein the color resin particle is obtained by pulverizing a kneaded product, the kneaded product being obtained by mixing the binder resin, the colorant, the charge control agent, the release agent, and the polar resin and then kneading a mixture thereof under heating.

* * * * *